(12) United States Patent
Hagman

(10) Patent No.: US 8,029,642 B2
(45) Date of Patent: Oct. 4, 2011

(54) TAPE REMOVAL APPARATUS AND PROCESS

(75) Inventor: Thomas J Hagman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 863 days.

(21) Appl. No.: 11/829,525

(22) Filed: Jul. 27, 2007

(65) Prior Publication Data
US 2009/0025875 A1 Jan. 29, 2009

(51) Int. Cl.
B32B 38/10 (2006.01)

(52) U.S. Cl. ........ 156/715; 156/760; 156/719; 156/767; 156/247; 156/249

(58) Field of Classification Search .................. 156/247, 156/249, 584, 715, 760, 719, 767
See application file for complete search history.

(56) References Cited

U.S. PATENT DOCUMENTS

| | | | |
|---|---|---|---|
| 4,491,493 A | 1/1985 | Eaton | |
| 4,531,992 A | 7/1985 | Eaton | |
| 4,541,886 A * | 9/1985 | Marlow et al. | 156/230 |
| 4,880,488 A * | 11/1989 | Matsuo et al. | 156/344 |
| 4,978,417 A | 12/1990 | Grimshaw et al. | |
| 5,114,519 A * | 5/1992 | Grimshaw et al. | 156/235 |
| 5,480,508 A * | 1/1996 | Manabe et al. | 156/353 |
| 5,482,589 A * | 1/1996 | Shin et al. | 156/268 |
| 5,879,505 A * | 3/1999 | Fujisawa et al. | 156/344 |
| 6,966,966 B2 * | 11/2005 | Koizumi et al. | 156/344 |
| 2006/0147669 A1* | 7/2006 | Mano et al. | 428/85 |

* cited by examiner

Primary Examiner — Mark A Osele
Assistant Examiner — Nickolas Harm
(74) Attorney, Agent, or Firm — Klintworth & Rozenblat IP LLC

(57) ABSTRACT

An apparatus and method is provided for removing a selected portion of tape material from backing paper. One embodiment of an apparatus may include a supply reel, at least one cutting member, at least one bending member, and first and second vacuum rollers. The apparatus may further include pinch rollers, scraping members, and scrap bins. The apparatus may allow for the removal of scrap tape material from the backing paper.

16 Claims, 10 Drawing Sheets

TAPE REMOVAL APPARATUS AND PROCESS

BACKGROUND

Many apparatus and methods exist for automatically preparing cassette spools or reels wound with tape material on original backing paper or film. This prepeg tape material may be a composite, unidirectional tape which may be used to form a laminate. In one existing apparatus/method, tape material on backing paper is unrolled from a supply reel, the tape material is cut into the required configuration, removed from the original backing paper, and then transferred to another release backing paper and wound onto a cassette spool. However, the transferring of the tape material to another backing paper may create problems. The tape material may lose some of its tacking ability, may not align as well on the new backing paper, may not adhere well to the new backing paper, and may have placement problems when placed on a working surface. Further, the new backing paper may have a certain amount of stretch which may cause tension problems, may form wrinkles when the tape is placed onto a working surface, and/or may not allow good tacking of the tape material onto the working surface. This may cause problems with tape lifting from the working surface, or may cause wrinkles to be formed in the laminate being formed with the tape material. Moreover, the process of putting the tape material onto a new backing paper may require an excessive number of machines, may increase the costs, may increase the time required, may reduce efficiency, and/or may lead to one or more other problems.

An apparatus, and/or method for removing tape material from backing paper, is needed to decrease one or more problems associated with one or more of the existing apparatus and/or methods.

SUMMARY

In one aspect of the disclosure, a method of removing tape material from backing paper is provided. In one step, tape material on backing paper is unrolled from a supply reel. In another step, first and second spaced apart portions of the unrolled tape material are created when the unrolled tape material is cut while still on the backing paper. In still another step, a third portion of the unrolled tape material, between the cut first and second spaced apart portions, is cut while still on the backing paper. The third portion comprises cut first and second adjacent ends. In an additional step, a bending member is pressed against a portion of the backing paper which the cut third portion is disposed on to begin to separate the cut first and second adjacent ends of the unrolled tape material from the backing paper. In still another step, the cut first adjacent end is rolled at least partially around a first roller to remove from the backing paper the cut unrolled tape material between the first cut adjacent end and the cut first portion. In another step, the second adjacent end is rolled at least partially around a second roller to remove from the backing paper the cut unrolled tape material between the cut second adjacent end and the cut second portion.

In another aspect of the disclosure, an apparatus for removing tape material from backing paper is provided. The apparatus includes a supply reel for supplying and unrolling tape material on backing paper. The apparatus further includes at least one cutting member for cutting first and second spaced apart portions of unrolled tape material while still on backing paper, and for cutting a third portion, comprising adjacent first and second ends, of unrolled tape material while still on backing paper between cut first and second spaced apart portions of unrolled tape material. The apparatus additionally includes at least one bending member for pressing against backing paper upon which a cut third portion is disposed in order to separate cut first and second adjacent ends of unrolled tape material from backing paper. The apparatus further includes a first vacuum roller for rolling a cut first adjacent end of unrolled tape material at least partially around the first vacuum roller to remove from backing paper a cut unrolled tape material between a cut first adjacent end and a cut first portion. The apparatus also includes a second vacuum roller adjacent to the first vacuum roller for rolling a cut second adjacent end of unrolled tape material at least partially around the second vacuum roller to remove from backing paper a cut unrolled tape material between a cut second adjacent end and a cut second portion.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
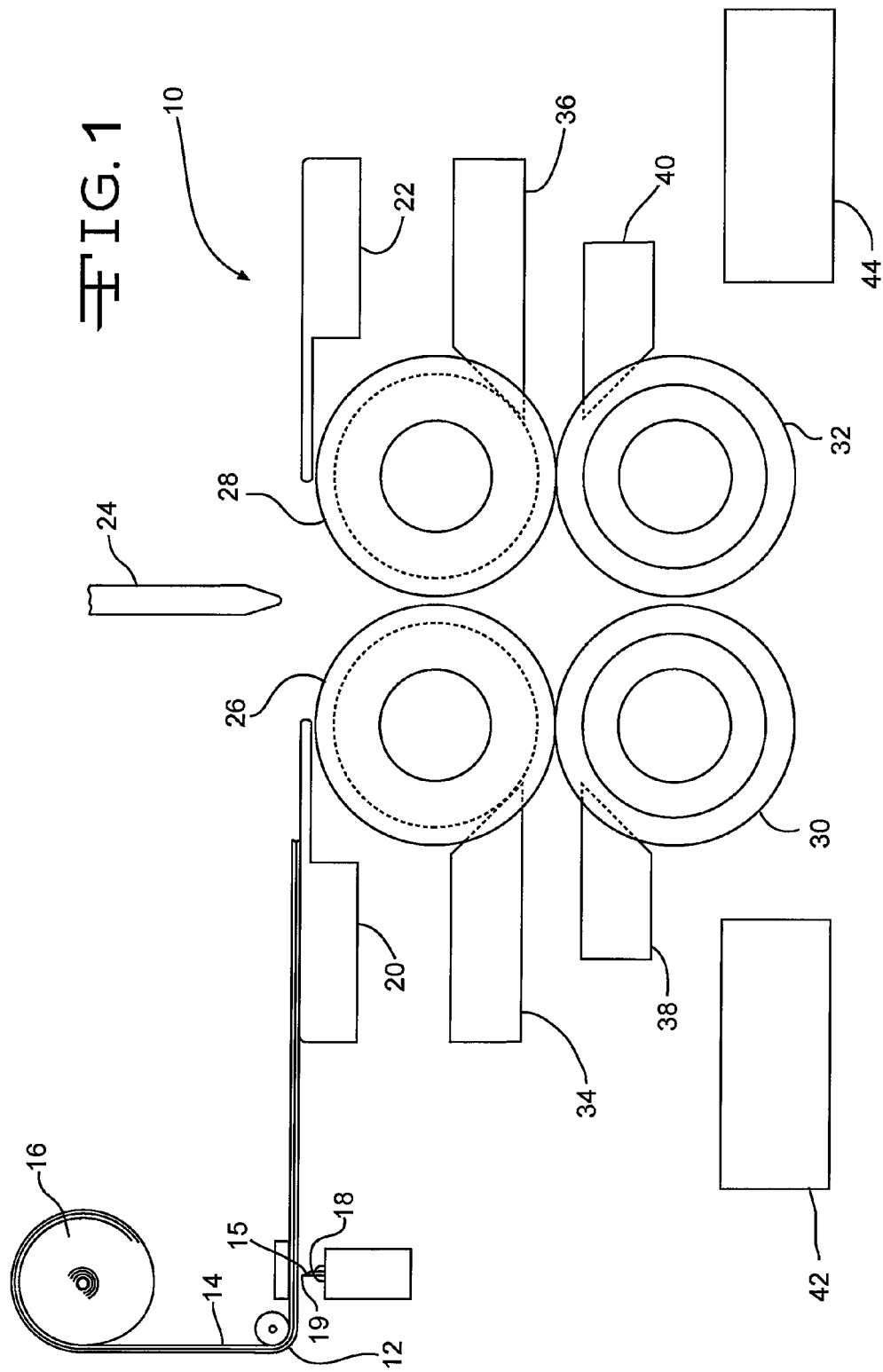
FIG. 1 shows a front view of one embodiment of an apparatus for removing tape material from backing paper in which the apparatus has unrolled and cut tape material.

FIG. 1 shows a front view of one embodiment of an apparatus 10 for removing tape material 12 from backing paper 14. The tape material 12 may comprise for example and without limitation a composite prepeg (pre-impregnated with resin) tape, a graphite, ceramic, aramid, glass, or other tape material. The tape material 12 may be unidirectional. The apparatus 10 may comprise a supply reel 16, at least one cutting member 18, a first shelf member 20, a second shelf member 22, at least one bending member 24, a first roller 26, a second roller 28, a third roller 30, a fourth roller 32, a first scraping member 34, a second scraping member 36, a third scraping member 38, a fourth scraping member 40, a first scrap bin 42, and a second scrap bin 44.

Figure 2:
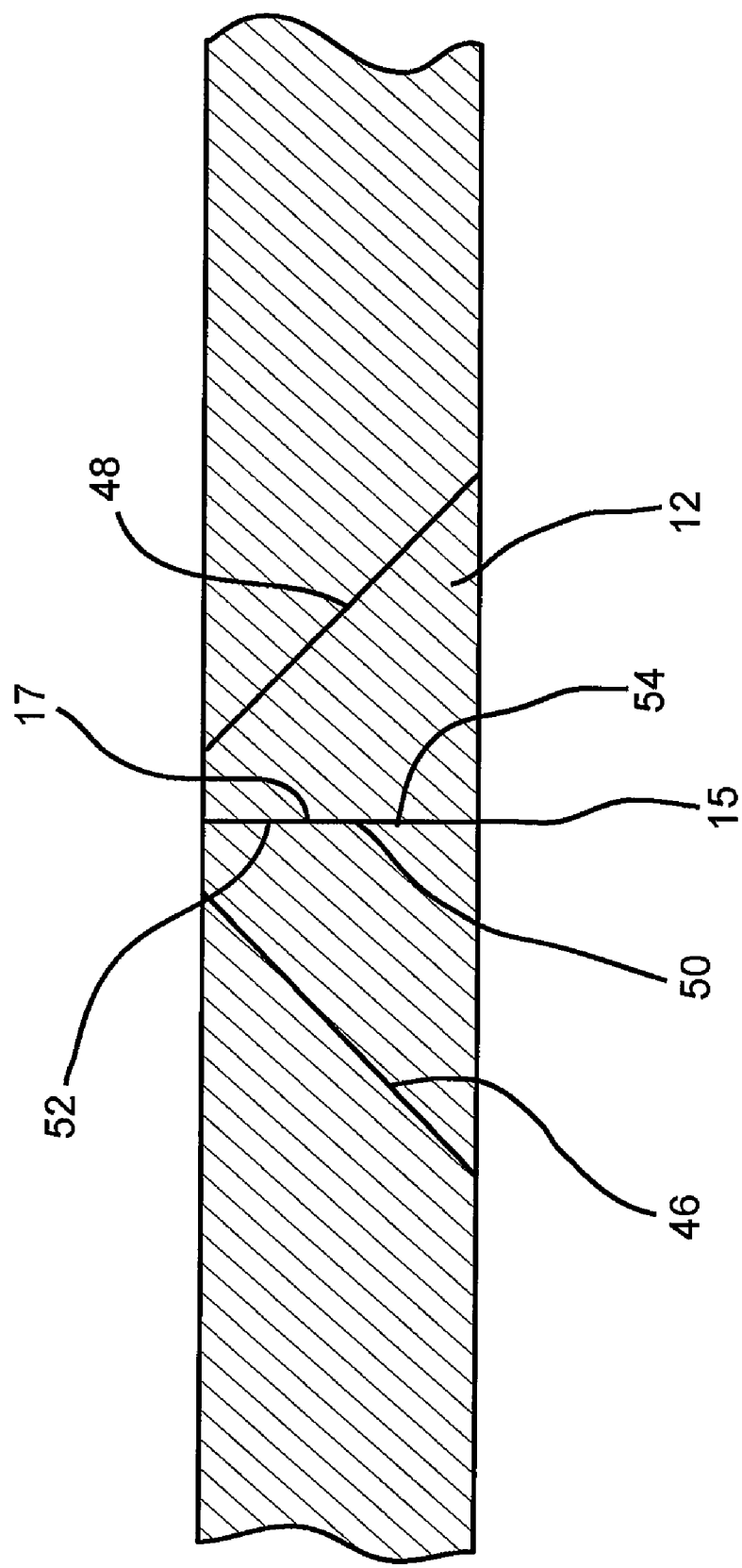
FIG. 2 shows a bottom view of a portion of the cut unrolled tape material of the embodiment of FIG. 1 without the apparatus.

In FIG. 1, the supply reel 16 has been used to supply and unroll the tape material 12, while still on the backing paper 14, to a location 15 over the one or more cutting members 18, which have one or more sharp edges 19. The one or more cutting members 18 has cut the unrolled tape material 12 at location 15. The tape material 12 is cut without cutting the backing paper 14. FIG. 2 shows a bottom view of a portion of the cut unrolled tape material 12 at location 15. As shown, the one or more cutting members 18 have been used to cut first and second spaced apart portions 46 and 48, which may comprise spaced apart angular cuts, of the unrolled tape material 12 which is still on the backing paper 14. The one or more cutting members 18 have further been used to cut a third portion 50 of the unrolled tape material 12 which is still on the backing paper 14, which may comprise a straight, perpendicular cut in the unrolled tape material 12, in substantially the center 17 of the cut first and second spaced apart portions 46 and 48. The cut third portion 50 may comprise adjacent first and second ends 52 and 54 of the cut unrolled tape material 12 on the backing paper 14. In other embodiments, the third portion 50 may be at any point in-between the cut first and second spaced apart portions 46 and 48. In still other embodiments, the first, second, and third portions 46, 48, and 50 may be of differing shapes, sizes, locations, orientations, and configurations. In still other embodiments, a varying number of cut portions may be utilized.

Figure 3:
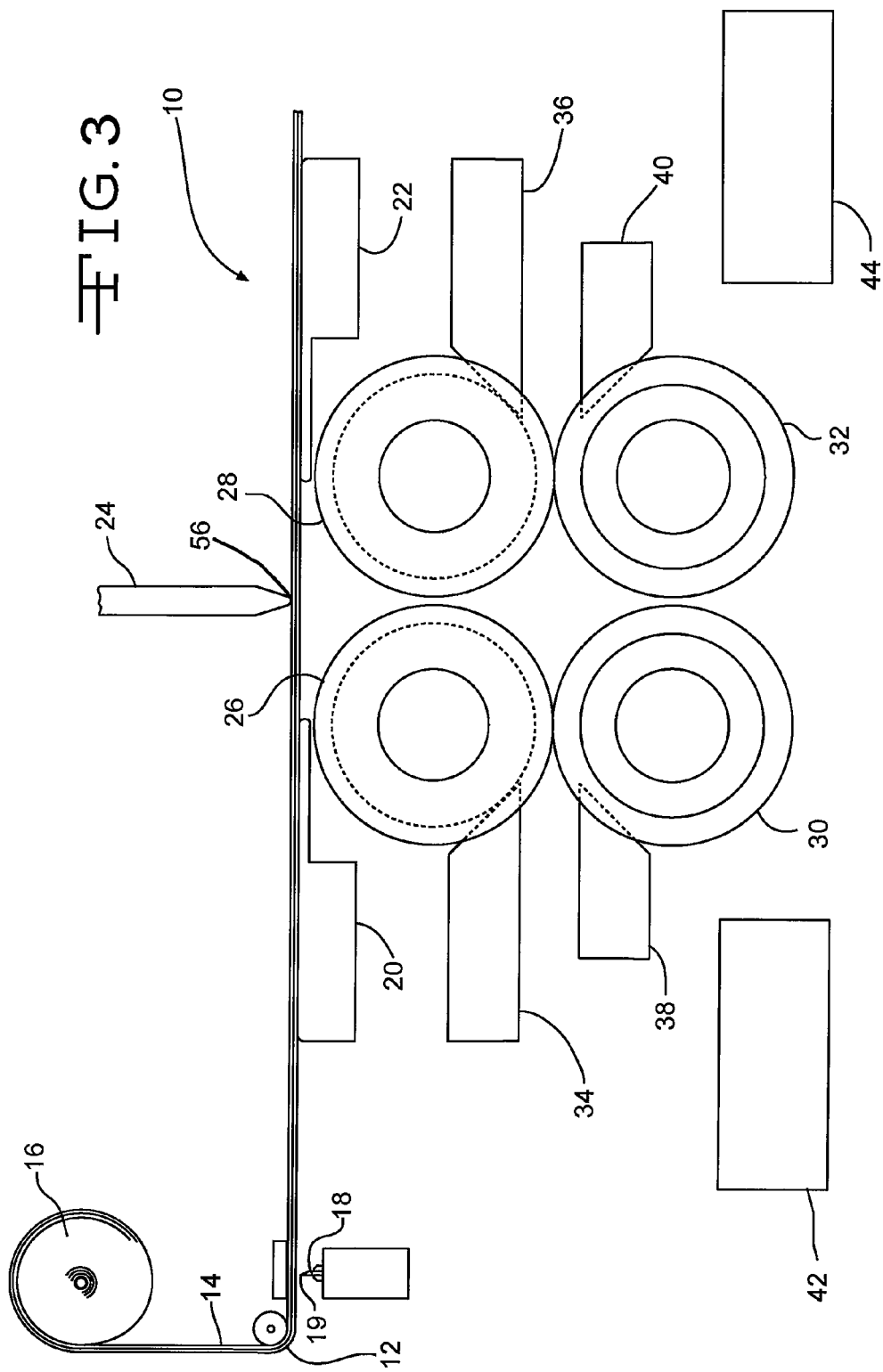
FIG. 3 is the same view of the embodiment of FIG. 3 at a different stage with the cut unrolled tape material on the backing paper having been moved to a location under a bending member.

FIG. 3 is the same view of the embodiment of FIG. 1 at a different stage with the cut unrolled tape material 12 on the backing paper 14 having been moved to a location 56 under the at least one bending member 24. The first and second shelf members 20 and 22 are keeping the tape material 12 on the backing paper 14 from coming in contact with the first and second rollers 26 and 28.

Figure 4:
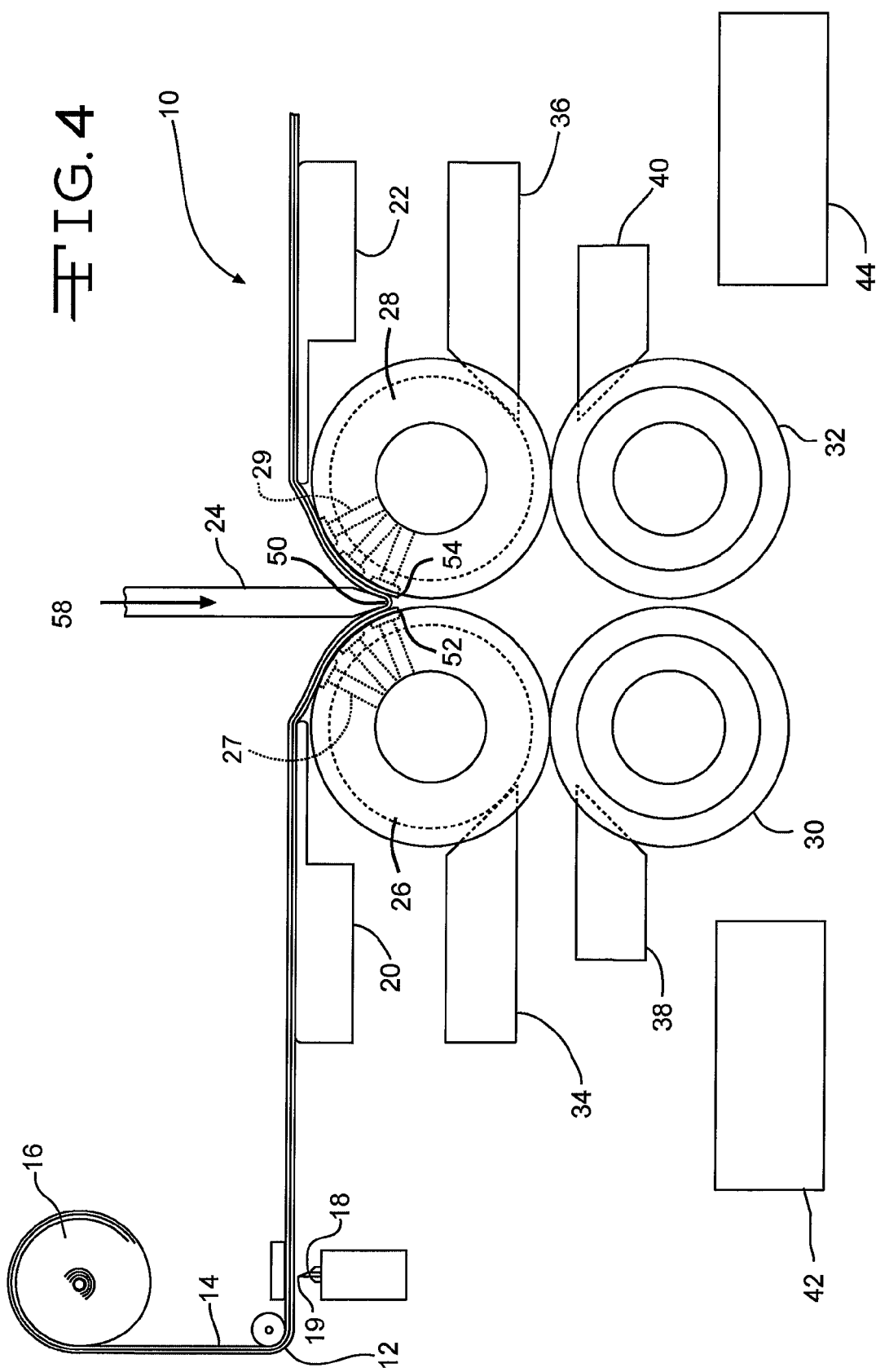
FIG. 4 is the same view of the embodiment of FIG. 3 at a different stage with the bending member pressing against the backing paper.
Figure 5:
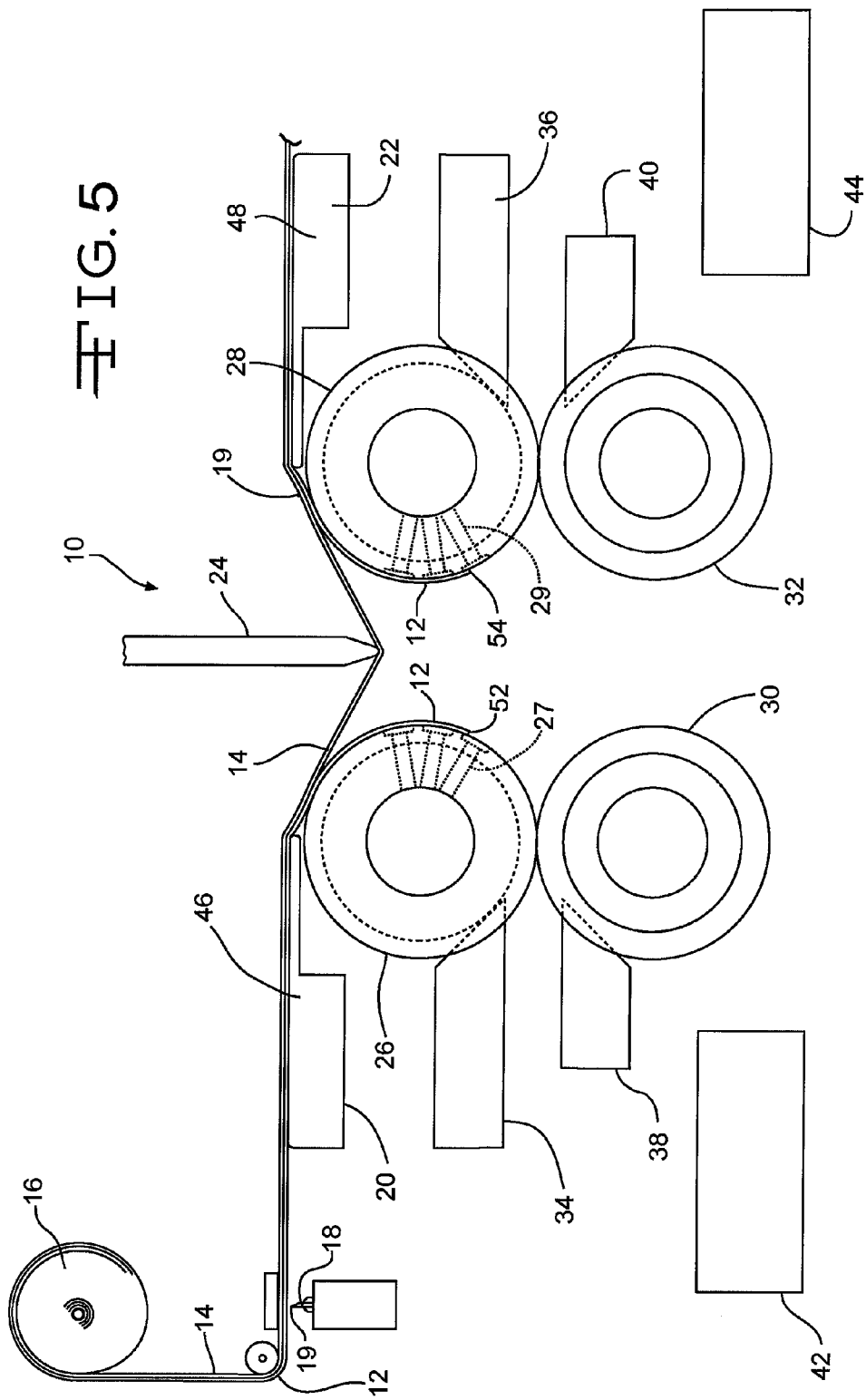
FIG. 5 is the same view of the embodiment of FIG. 4 at a different stage with cut unrolled tape material rolling around rollers.

FIG. 4 is the same view of the embodiment of FIG. 3 at a different stage with the at least one bending member 24 having been lowered along direction 58 in order to press against the backing paper 14 upon which the cut third portion 50 is disposed. The bending member 24 may comprise a bar member or other type of bending member. The pressing of the bending member 24 against the backing paper 14 has caused the cut third portion 50 to drop downward and be abutted against the initially adjacent first and second rollers 26 and 28. As shown in FIG. 5, due to the pressing of the at least one bending member 24 against the backing paper 14, the cut first and second adjacent ends 52 and 54 of the unrolled tape material 12 has begun to separate from the backing paper 14 which has remained intact. The first and second rollers 26 and 28 may each comprise vacuum rollers 27 and 29 which are adapted to provide vacuum forces on the cut unrolled tape material 12 to draw it towards the first and second rollers 26 and 28.

FIG. 5 is the same view of the embodiment of FIG. 4 at a different stage with the first roller 26 having been rolled clockwise and the second roller 28 having been rolled counterclockwise. It should be noted that the third roller 30, which may comprise a pinch roller abutting against the first roller 26, has rotated counterclockwise against the first roller 26. Similarly, the fourth roller 32, which may comprise a pinch roller abutting against the second roller 28, has rotated clockwise against the second roller 28. As shown, due to the vacuum attraction forces 27 of the first roller 26, the separated first adjacent end 52 of the unrolled tape material 12 has been held to roller 26 and has begun rolling partially around the first roller 26 to remove from the backing paper 14 more of the cut unrolled tape material 12 from the separated first adjacent end 52 towards the cut first portion 46. Similarly, due to the vacuum attraction forces 29 of the second roller 28, the separated second adjacent end 54 of the unrolled tape material 12 has been held to roller 28 and has begun rolling partially around the second roller 28 to remove from the backing paper 14 more of the cut unrolled tape material 12 from the separated second adjacent end 54 towards the cut second portion 48. The backing paper 14 has remained intact substantially in its position of FIG. 4.

Figure 6:
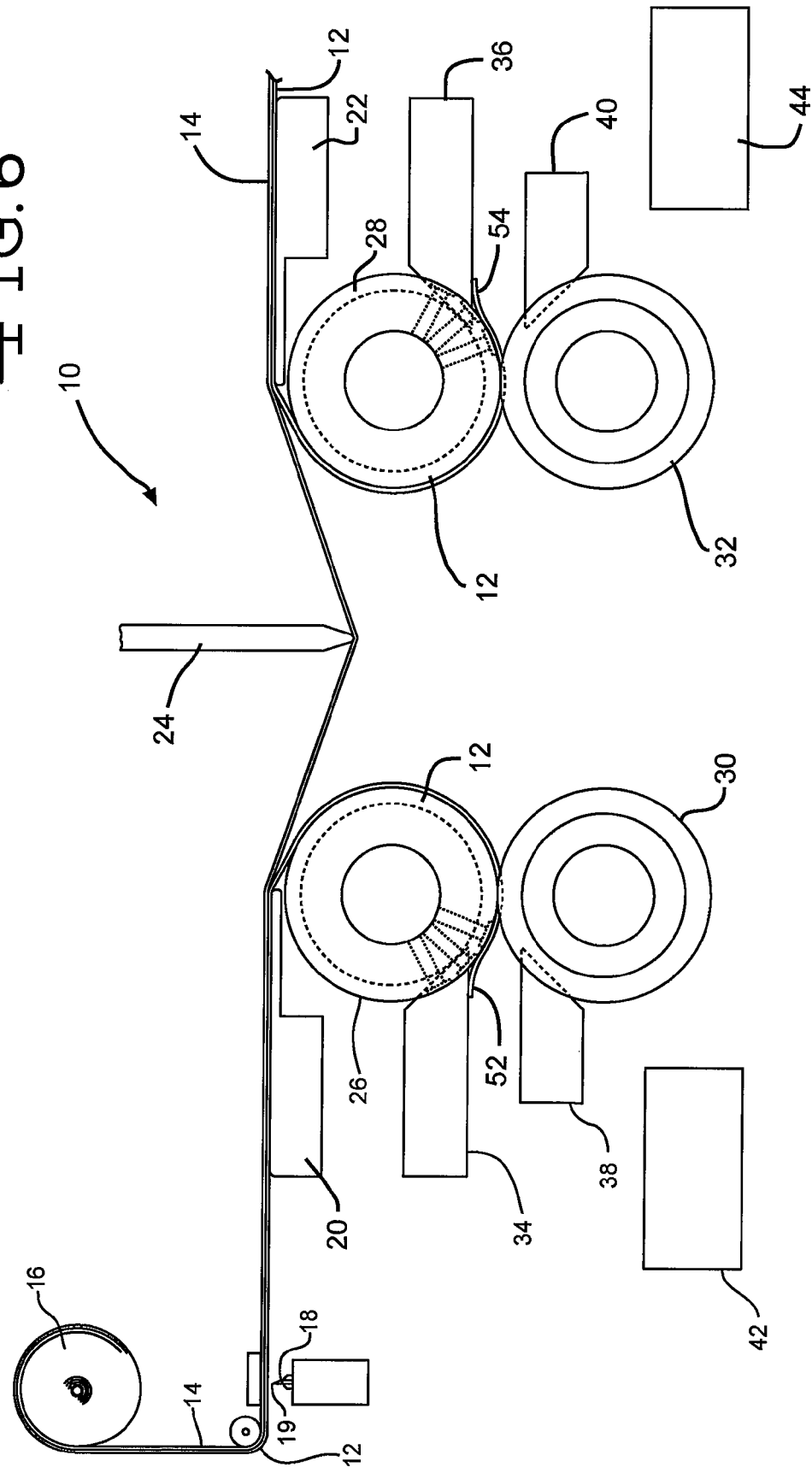
FIG. 6 is the same view of the embodiment of FIG. 5 at a different stage with the cut unrolled tape material rolling further around the rollers and scraping members scraping a portion of the cut unrolled tape material off the rollers.

FIG. 6 is the same view of the embodiment of FIG. 5 at a different stage with the first roller 26 having been rolled further clockwise, the second roller 28 having been rolled further counterclockwise, the third roller 30 having been rotated further counterclockwise, and the fourth roller 32 having been rotated further clockwise. As shown, the third roller 30 has pinched the separated first adjacent end 52 of the unrolled tape material 12 against the first roller 26, and forced the separated first adjacent end 52 to pass between the third roller 30 and the first roller 26. The clockwise rotation of the first roller 26 and the counterclockwise rotation of the third roller 30 has caused the separated first adjacent end 52 to come in contact with the first scraping member 34 which has scraped the separated first adjacent end 52 off the first roller 26.

Similarly, the fourth roller 32 has pinched the separated second adjacent end 54 of the unrolled tape material 12 against the second roller 28, and forced the separated second adjacent end 54 to pass between the fourth roller 32 and the second roller 28. The counterclockwise rotation of the second roller 28 and the clockwise rotation of the fourth roller 32 has caused the separated second adjacent end 54 to come in contact with the second scraping member 36 which has scraped the separated second adjacent end 54 off the second roller 28. In other embodiments, the third scraping member 38 may scrape the separated first adjacent end 52 off the third roller 30, and the fourth scraping member 40 may scrape the separated second adjacent end 54 off the fourth roller 32. Once the tape material is trapped by the pinch rollers 30 and 32, the vacuum attraction forces 27 and 29 may be turned off to ease the scraping of the tape material from the vacuum rollers 26 and 28.

Figure 7:
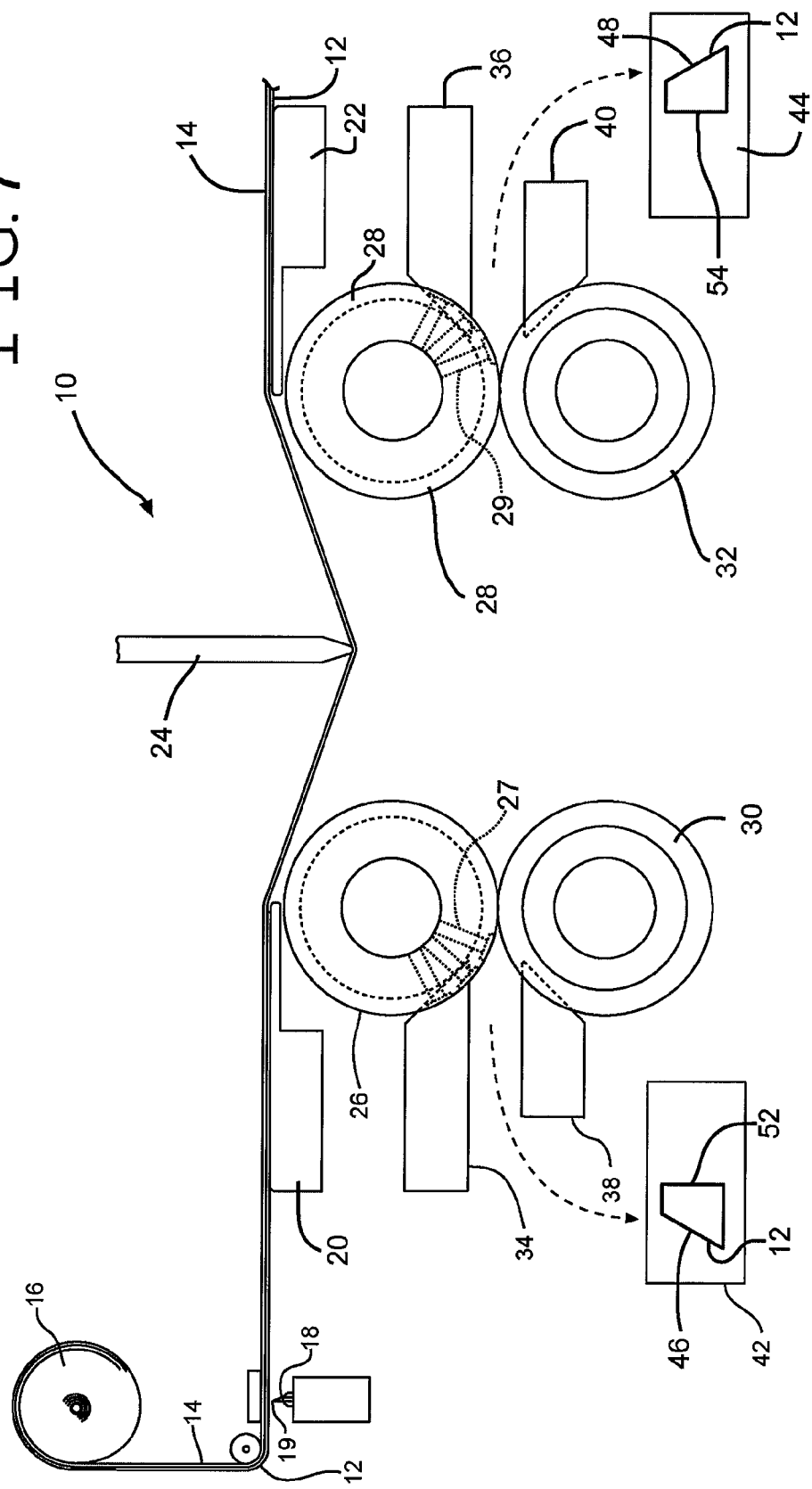
FIG. 7 is the same view of the embodiment of FIG. 6 at a different stage with the cut unrolled tape material being deposited in scrap bins.

FIG. 7 is the same view of the embodiment of FIG. 6 at a different stage with the first roller 26 having been rolled even further clockwise, the second roller 28 having been rolled even further counterclockwise, the third roller 30 having been rotated even further counterclockwise, and the fourth roller 32 having been rotated even further clockwise. As shown, the further rotation of the first and third rollers 26 and 30 along with the scraping of the first scraping member 34 has caused the cut unrolled tape material 12 to completely separate and be removed from the backing paper 14, from the separated first adjacent end 52 to the cut first portion 46, and be deposited in the first scrap bin 42.

Similarly, the further rotation of the second and fourth rollers 28 and 32 along with the scraping of the second scraping member 36 has caused the cut unrolled tape material 12 to completely separate and be removed from the backing paper 14, from the separated second adjacent end 54 to the cut second portion 48, and be deposited in the second scrap bin 44.

Figure 8:
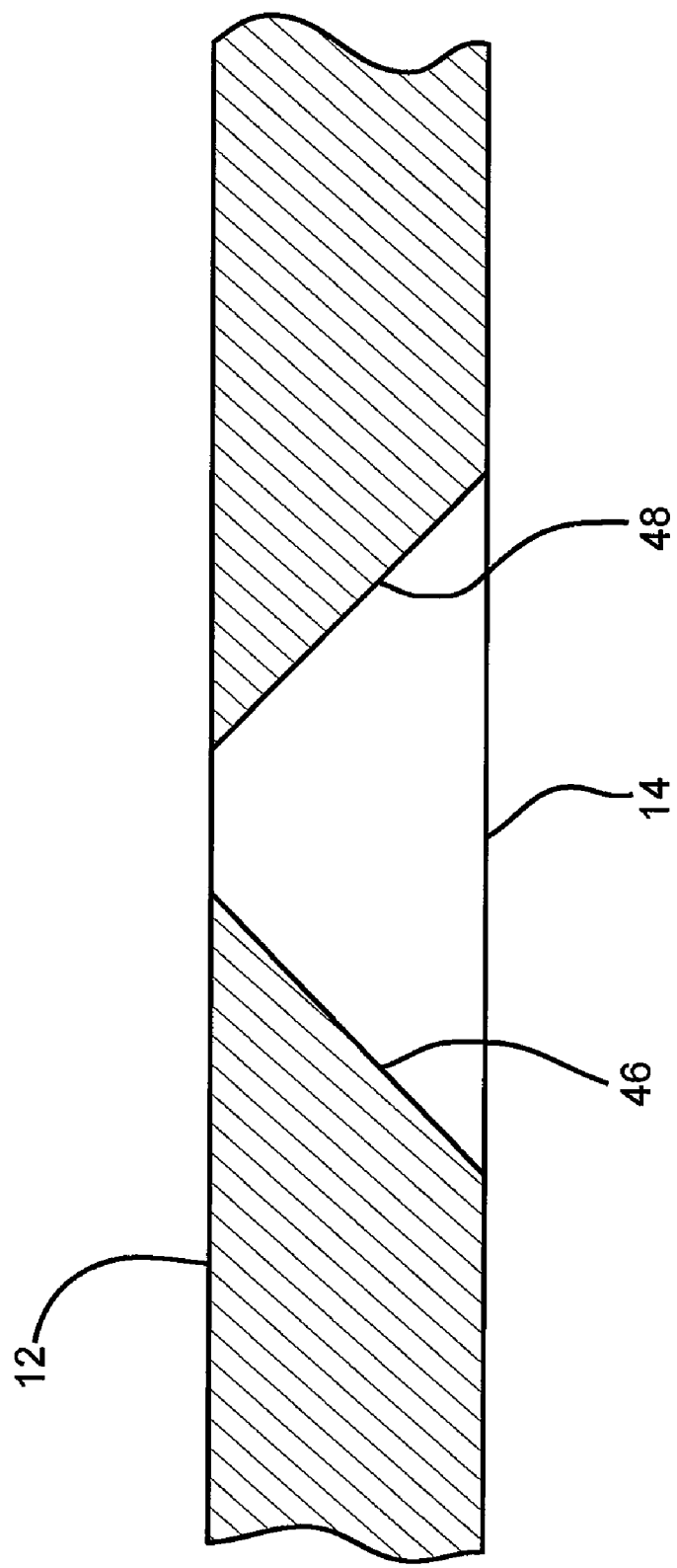
FIG. 8 shows a bottom view of the unrolled tape material of the embodiment of FIG. 2 after the cut tape portion has been completely removed from the backing paper using the apparatus of FIG. 1.

FIG. 8 shows a bottom view of the unrolled tape material 12 of the embodiment of FIG. 2 after the cut tape portion between the first and second portions 46 and 48 has been completely removed from the backing paper 14, as shown in FIG. 7. As can be seen, the backing paper 14 is intact with the cut tape portion between the first and second portions 46 and 48 completely removed.

Figure 9:
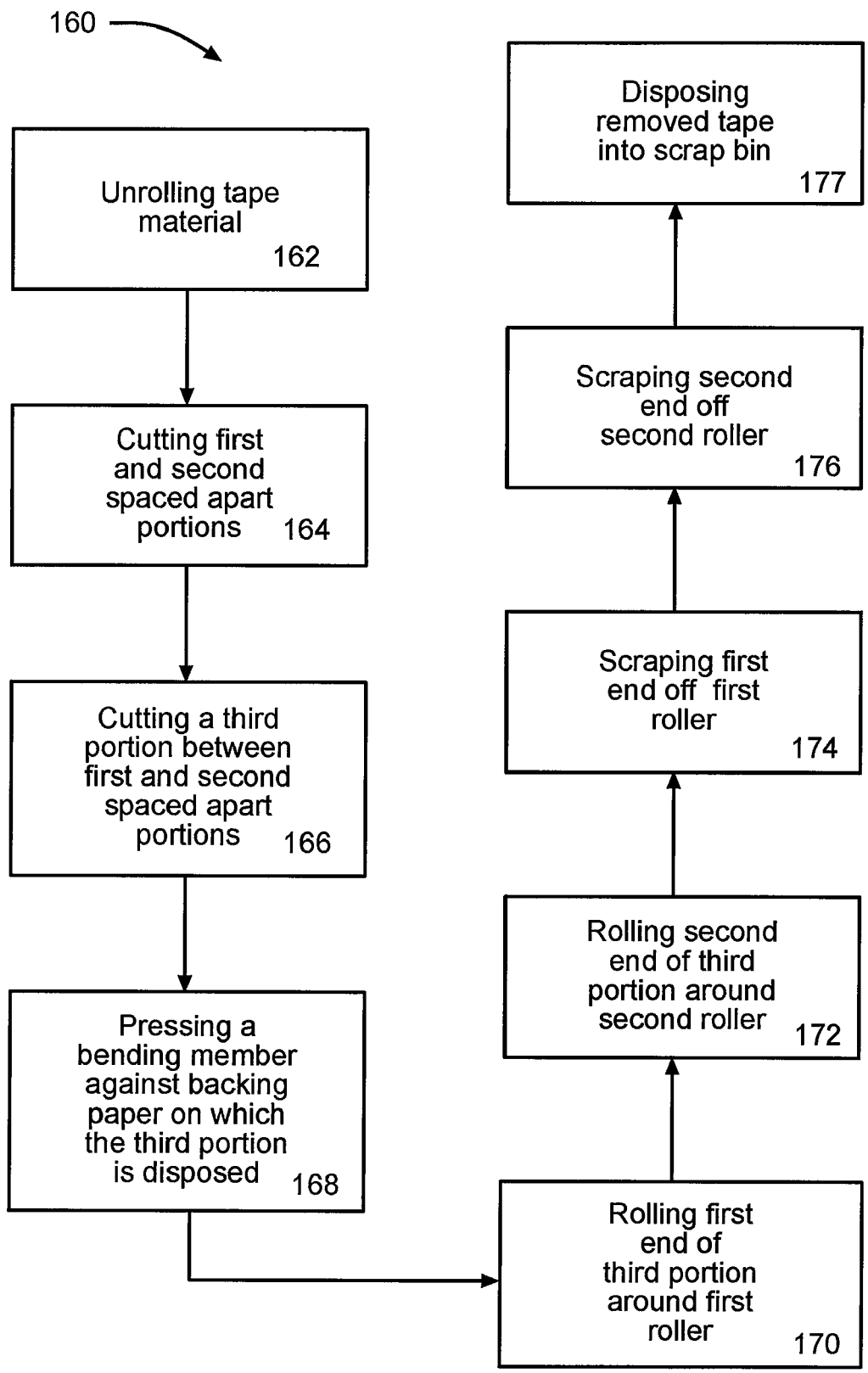
FIG. 9 shows an embodiment of a method of removing tape material from backing paper.

FIG. 9 shows an embodiment of a method 160 of removing tape material 12 from backing paper 14. The method 160 may utilize any of the herein disclosed embodiments of the apparatus 10, including any of its varying components. In one step 162, a tape material 12 is unrolled on backing paper 14 from a supply reel 16. In another step 164, first and second spaced apart portions 46 and 48 of the unrolled tape material 12 are cut while the unrolled tape material 12 is still on the backing paper 14.

The cut first and second spaced apart portions 46 and 48 may comprise spaced apart angular cuts of the unrolled tape material 12 on the backing paper 14. A cutting member 18 may be utilized having at least one sharp edge 19. In yet another step 166, a third portion 50 may be cut, while still on the backing paper 14, of the unrolled tape material 12 between the cut first and second spaced apart portions 46 and 48 of the unrolled tape material 12. A cutting member 18 may again be utilized having at least one sharp edge 19. The third portion 50 may comprise cut first and second adjacent ends 52 and 54. The third portion 50 may further comprise a perpendicular, straight cut in the unrolled tape material 12 which is still on the backing paper 14. The third portion 50 may be substantially in a center 17 of the cut first and second spaced apart portions 46 and 48.

In an additional step 168, a bending member 24, which may comprise a bar member, may be pressed against a portion of the backing paper 14, which the cut third portion 50 is disposed on, to begin to separate the cut first and second adjacent ends 52 and 54 of the unrolled tape material 12 from the backing paper 14. The bending member 24 may press the cut first adjacent end 52 against a first roller 26 and the cut second adjacent end 54 against a second roller 28.

In still another step 170, the cut first adjacent end 52 may be rolled at least partially around the first roller 26, which may comprise a vacuuming vacuum roller, to remove from the backing paper 14 the cut unrolled tape material 12 between the first cut adjacent end 52 and the cut first portion 46. The cut first adjacent end 52 may be rolled between a first vacuum roller 26 and a third pinch roller 30. In yet another step 172, the second adjacent end 54 may be rolled at least partially around a second roller 28, which may comprise a vacuuming vacuum roller, to remove from the backing paper 14 the cut unrolled tape material 12 between the cut second adjacent end 54 and the cut second portion 48. The cut second adjacent end 54 may be rolled between a second vacuum roller 28 and a fourth pinch roller 32.

In an additional step 174, the cut first adjacent end 52 may be scraped off at least one of the first roller 26 and the third roller 30 using at least one scraping member 34 and 38. In still another step 176, the cut second adjacent end 54 may be scraped off at least one of the second roller 28 and the fourth roller 32 using at least another scraping member 36 and 40. In another step 177, the removed cut unrolled tape material 12 may be disposed into at least one scrap bin 42 and 44.

One or more embodiments of the disclosure may reduce and/or eliminate one or more problems which may have been experienced by one or more of the existing apparatus or methods. For instance, one or more embodiments of the disclosure may reduce the numbers and amounts of backing paper needed, may reduce costs, may reduce the number of machines required, may substantially reduce time since the process may be carried out without transferring cut tape to new backing paper, may lead to less wrinkling and/or tension in the tape material against the backing paper since new backing paper is not required, may improve the adherence of the cut tape to the backing paper since new backing paper is not required, may reduce tacking problems, may reduce problems in transferring tape resin to new backing paper, may improve efficiency, may be less complex, may be more reliable, may be more accurate, may make it less difficult to place tape against working surfaces by providing improved tracking and guidance, may reduce tape lifting from working surfaces, and/or may reduce and/or eliminate one or more other types of problems in one or more of the existing apparatus and/or methods.

Figure 10:
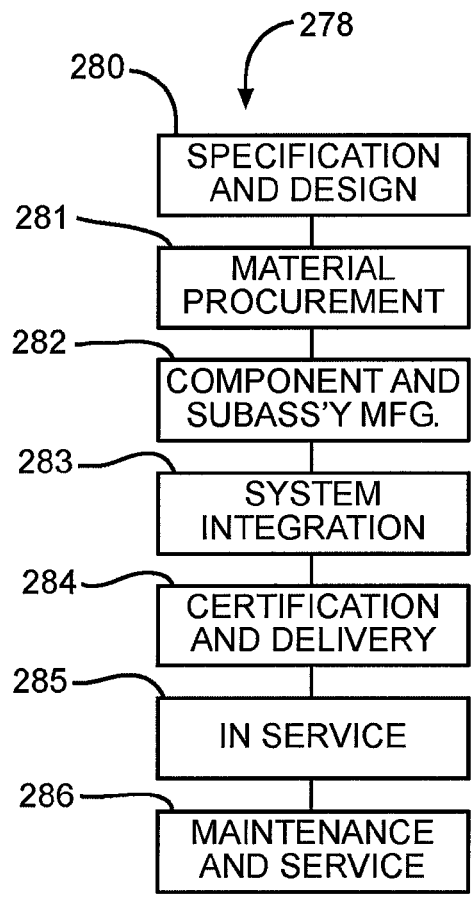
FIG. 10 is a flow diagram of an aircraft production and service methodology.
Figure 11:
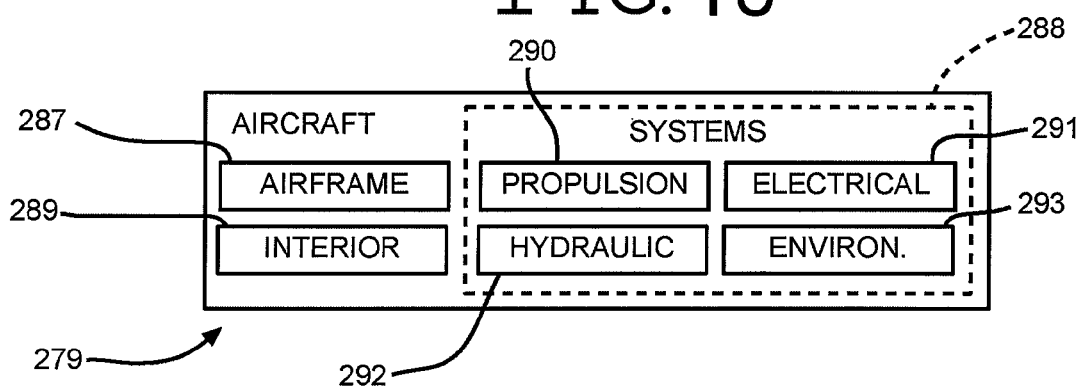
FIG. 11 is a block diagram of an aircraft.

Referring more particularly to the drawings, embodiments of the disclosure may be described in the context of an aircraft manufacturing and service method 278 as shown in FIG. 10 and an aircraft 279 as shown in FIG. 11. During pre-production, exemplary method 278 may include specification and design 280 of the aircraft 279 and material procurement 281. During production, component and subassembly manufacturing 282 and system integration 283 of the aircraft 279 takes place. Thereafter, the aircraft 279 may go through certification and delivery 284 in order to be placed in service 285. While in service by a customer, the aircraft 279 is scheduled for routine maintenance and service 286 (which may also include modification, reconfiguration, refurbishment, and so on).

Each of the processes of method 278 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 279 produced by exemplary method 278 may include an airframe 287 with a plurality of systems 288 and an interior 289. Examples of high-level systems 288 include one or more of a propulsion system 290, an electrical system 291, a hydraulic system 292, and an environmental system 293. Any number of other systems may be included. Although an aerospace example is shown, the principles of the invention may be applied to other industries, such as the automotive industry.

Apparatus and methods embodied herein may be employed during any one or more of the stages of the production and service method 278. For example, components or subassemblies corresponding to production process 282 may be fabricated or manufactured in a manner similar to components or subassemblies produced while the aircraft 279 is in service. Also, one or more apparatus embodiments, method embodiments, or a combination thereof may be utilized during the production stages 282 and 283, for example, by substantially expediting assembly of or reducing the cost of an aircraft 279. Similarly, one or more of apparatus embodiments, method embodiments, or a combination thereof may be utilized while the aircraft 279 is in service, for example and without limitation, to maintenance and service 286.

It should be understood, of course, that the foregoing relates to exemplary embodiments of the disclosure and that modifications may be made without departing from the spirit and scope of the disclosure as set forth in the following claims.

The invention claimed is:

1. A method of removing tape material from backing paper comprising:
   unrolling tape material on backing paper from a supply reel;
   cutting first and second spaced apart cuts in the unrolled tape material on said backing paper;
   cutting a third cut, between the first and second spaced apart cuts, in the unrolled tape material on said backing paper;
   moving a bending member in a linear direction towards first and second rollers to press the bending member, at the third cut, against the backing paper to separate first and second adjacent portions, disposed on opposite sides of the third cut, of the unrolled tape material from the backing paper;
   rolling the separated first adjacent portion onto the first roller to remove from the backing paper the separated first adjacent portion; and
   rolling the separated second adjacent portion onto the second roller to remove from the backing paper the separated second adjacent portion.

2. The method of claim 1 wherein the tape material comprises at least one of a composite, a graphite, a ceramic, an aramid, or glass.

3. The method of claim 1 wherein the cutting steps are done utilizing at least one cutting member having at least one sharp edge.

4. The method of claim 1 wherein the first and second spaced apart cuts are non-parallel to a longitudinal axis of the unrolled tape material.

5. The method of claim 1 wherein the third cut is perpendicular to a longitudinal axis of the unrolled tape material.

6. The method of claim 1 wherein the third cut is located equidistant from each of the first and second spaced apart cuts.

7. The method of claim 1 wherein the bending member comprises a bar member.

8. The method of claim 1 wherein during the moving step, the bending member presses the first adjacent portion against the first roller and the second adjacent portion against the second roller.

9. The method of claim 1 wherein the first roller comprises a first vacuum roller and the second roller comprises a second vacuum roller.

10. The method of claim 9 wherein during the rolling steps the first vacuum roller vacuums the first adjacent portion against the first vacuum roller and the second vacuum roller vacuums the second adjacent portion against the second vacuum roller.

11. The method of claim 9 wherein the rolling steps further comprise rolling the first adjacent portion between the first vacuum roller and a third pinch roller, and rolling the second adjacent portion between the second vacuum roller and a fourth pinch roller, and further comprising scraping the first adjacent portion off at least one of the first vacuum roller or the third pinch roller using a first scraping member, and scraping the second adjacent portion off at least one of the second vacuum roller or the fourth pinch roller using a second scraping member.

12. The method of claim 1 wherein the rolling steps further comprise rolling the first adjacent portion between the first roller and a third pinch roller, and rolling the second adjacent portion between the second roller and a fourth pinch roller.

13. The method of claim 1 wherein the rolling steps further comprise scraping the first adjacent portion off at least one of the first roller or a third roller using a first scraping member, and scraping the second adjacent portion off at least one of the second roller or a fourth roller using a second scraping member.

14. The method of claim 1 further comprising disposing the first and the second adjacent portions into at least one scrap bin.

15. The method of claim 1 further comprising moving the first and second rollers in lateral directions away from the bending member and away from one another, to separate the first and second rollers from the bending member, after the bending member separates the first and second adjacent portions.

16. A method of removing tape material from backing paper comprising:
   unrolling tape material on backing paper from a supply reel;
   cutting first and second spaced apart cuts in the unrolled tape material on said backing paper;
   cutting a third cut, between the first and second spaced apart cuts, in the unrolled tape material on said backing paper;
   pressing a bending member against the backing paper to separate first and second adjacent portions, disposed on opposite sides of the third cut, of the unrolled tape material from the backing paper;
   rolling the separated first adjacent portion onto a first roller to remove from the backing paper the separated first adjacent portion;
   rolling the separated second adjacent portion onto a second roller to remove from the backing paper the separated second adjacent portion; and
   moving the first and second rollers in lateral directions away from the bending member and away from one another, to separate the first and second rollers from the bending member, after the bending member separates the first and second adjacent portions.

* * * * *